United States Patent
Douglis et al.

(10) Patent No.: US 10,437,782 B2
(45) Date of Patent: Oct. 8, 2019

(54) STATE-BASED DIRECTING OF SEGMENTS IN A MULTINODE DEDUPLICATED STORAGE SYSTEM

(71) Applicant: EMC Corporation, Hopkinton, MA (US)

(72) Inventors: Frederick Douglis, Basking Ridge, NJ (US); Philip Shilane, Morrisville, PA (US); R. Hugo Patterson, Los Altos, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 306 days.

(21) Appl. No.: 14/267,733

(22) Filed: May 1, 2014

(65) Prior Publication Data

US 2014/0324796 A1 Oct. 30, 2014

Related U.S. Application Data (63) Continuation of application No. 12/653,313, filed on Dec. 11, 2009, now Pat. No. 8,751,448.

(51) Int. Cl.
G06F 16/174 (2019.01)
G06F 3/06 (2006.01)
G06F 16/13 (2019.01)

(52) U.S. Cl.
CPC ........ *G06F 16/1748* (2019.01); *G06F 3/0608* (2013.01); *G06F 3/0641* (2013.01); *G06F 3/0689* (2013.01); *G06F 16/137* (2019.01); *G06F 16/1744* (2019.01)

(58) Field of Classification Search
CPC .............. G06F 11/1456; G06F 3/0608; G06F 16/1748; G06F 16/137
See application file for complete search history.

(56) References Cited

U.S. PATENT DOCUMENTS

| | | | |
|---|---|---|---|
| 7,908,436 B1* | 3/2011 | Srinivasan | G06F 3/0622 711/103 |
| 2005/0027862 A1* | 2/2005 | Nguyen | G06F 9/505 709/225 |
| 2008/0294660 A1* | 11/2008 | Patterson | G06F 17/30312 |
| 2010/0205163 A1* | 8/2010 | Eshghi et al. | 707/698 |
| 2011/0099351 A1* | 4/2011 | Condict | 711/216 |
| 2011/0307457 A1* | 12/2011 | Ishii | G06F 17/30283 707/692 |

* cited by examiner

*Primary Examiner* — Boris Gorney
*Assistant Examiner* — Christy Y Kim
(74) *Attorney, Agent, or Firm* — Womble Bond Dickinson (US) LLP (57) ABSTRACT

A system for directing for storage comprises a processor and a memory. The processor is configured to determine a segment overlap for each of a plurality of nodes. The processor is further configured to determine a selected node of the plurality of nodes based at least in part on the segment overlap for each of the plurality of nodes and based at least in part on a selection criteria. The memory is coupled to the processor and configured to provide the processor with instructions.

18 Claims, 11 Drawing Sheets

STATE-BASED DIRECTING OF SEGMENTS IN A MULTINODE DEDUPLICATED STORAGE SYSTEM

CROSS REFERENCE TO OTHER APPLICATIONS

This application is a continuation of U.S. patent application Ser. No. 12/653,313, now U.S. Pat. No. 8,751,448, entitled STATE-BASED DIRECTING OF SEGMENTS IN A MULTINODE DEDUPLICATED STORAGE SYSTEM filed Dec. 11, 2009, which is incorporated herein by reference for all purposes.

BACKGROUND OF THE INVENTION

Deduplication storage systems reduce physical storage space requirements by replacing duplicate regions of data (e.g., files or portions of files) with references to data already stored. Even though deduplication systems provide substantial compression for data storage enabling substantial storage in a single node, requirements for storage capacity, memory, and throughput can exceed a single node's storage capability. Multi-node deduplication storage systems typically deduplicate storage only within each node. This presents a challenge in that in order to achieve the same deduplication efficiency as a single node system an input data must always be directed to the node that has previously stored a copy of the input data. However, a naïve input data directing strategy can lead to a single node overloading (e.g., all input data going to a node with a very favorable overlap in data so that high storage efficiency is achieved) and/or can lead to inefficient deduplication (e.g., all input data being assigned to the least loaded node at any given time, regardless of past assignments, etc.).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for directing input data for storage is disclosed. The system comprises a processor and a memory. The processor is configured to determine a segment overlap for each of a plurality of nodes and determine a selected node of the plurality of nodes based at least in part on the segment overlap for each of the plurality of nodes and based at least in part on a selection criteria. The memory is coupled to the processor and configured to provide the processor with instructions. In some embodiments, an input stream is broken into segments; the segments are grouped into super segments; and the super segments are directed to a selected node.

In some embodiments, a storage system receives a stream of input data. The input data is broken into segments and stored in a manner such that the input stream can be reconstructed. For example, a table or index is maintained mapping the input data stream to the segments and/or mapping input data files to the segments. The segments are stored on a given node, but in the event that a copy of the segment has already been stored on the given node, a reference to the already stored copy of the segment is stored instead of storing the segment again.

In some embodiments, one or more segments are grouped into super segments and these super segments are directed to a node of a plurality of nodes. The node to which a super segment is directed is selected based at least in part on the number of segments of the super segment which are already stored on the node (i.e., overlap). The selection of a node uses one or more selection criteria. In various embodiments, the one or more selection criteria comprises a criterion based on the input data (e.g., a hash of the content of the input data, a meta data, a file name, a segment length, etc.), a criterion based on a node condition (e.g., storage capacity used, storage capacity used relative to an average storage capacity used by all the nodes, whether a threshold of storage capacity used has been exceeded, a node processor loading, a node processor loading relative to other nodes, a node input/output loading, a node input/output loading relative to other nodes), a criterion based on interaction between the input data and the node (e.g., number of segments of input data of a super segment that are already stored on a node, match of a hash of input data to a desirable hash value from a node, etc.), or any other appropriate selection criterion. In some embodiments, the selection criterion is selected in order to achieve storage compression efficiency. In various embodiments, the selection criterion is selected in order to achieve balancing for the different nodes storage, processor, and/or input/output loads.

In some embodiments, a random or other sampling of segments of the super segment are used to determine overlap or other selection criteria instead of all of the segments. In some embodiments, selecting the node for which the most overlap, or the most number of segments of the super segment are already stored, enables a high compression efficiency of physical storage space used to store the super segments, the segments, and the input data stream. In some embodiments, selecting the node for which the most overlap occurs in the event that the overlap is above a threshold (e.g., a threshold proportional to the number of segments in the super segment divided by the number of nodes, 1.5 times the average overlap or the random distribution expected for overlap, a threshold proportional to some linear or non-linear function of the number of nodes and/or overlap, etc.) and in the event that the overlap is not above the threshold, the node is selected using a default method. In some embodiments, ties are determined using a tie breaker strategy that is based on the loading of the involved nodes (e.g., the least loaded node wins). In various embodiments, the default method of selecting a node to direct to comprises selecting a least loaded node (e.g., lowest percentage physical space used), selecting using a hash of a first number of bytes of the super segment (e.g., the first 64 bytes), selecting using a hash of the first segment of the super segment (e.g., a SHA-1 hash), selecting using a hash of the super segment, the maximum or minimum hash of one of a plurality of windows of data or selected data in the segment or super segment, or any other appropriate manner of selecting a node. In some embodiments, the selection of node balances the goals of storage compression and load balancing of physical storage in each of the nodes of the plurality of nodes. In various embodiments, selecting the node is based on the overlap of a node weighted by the node loading, the overlap of a node weighted by the node loading and whether this exceeds a threshold, the overlap of a node and whether a node loading has exceeded a load threshold, or any other appropriate manner of selecting.

In some embodiments, overlap is based on a sample of segments in the super segment instead of all of the segments in the super segment. In some embodiments, a bloom filter or full index is used to determine overlap.

Figure 1A:
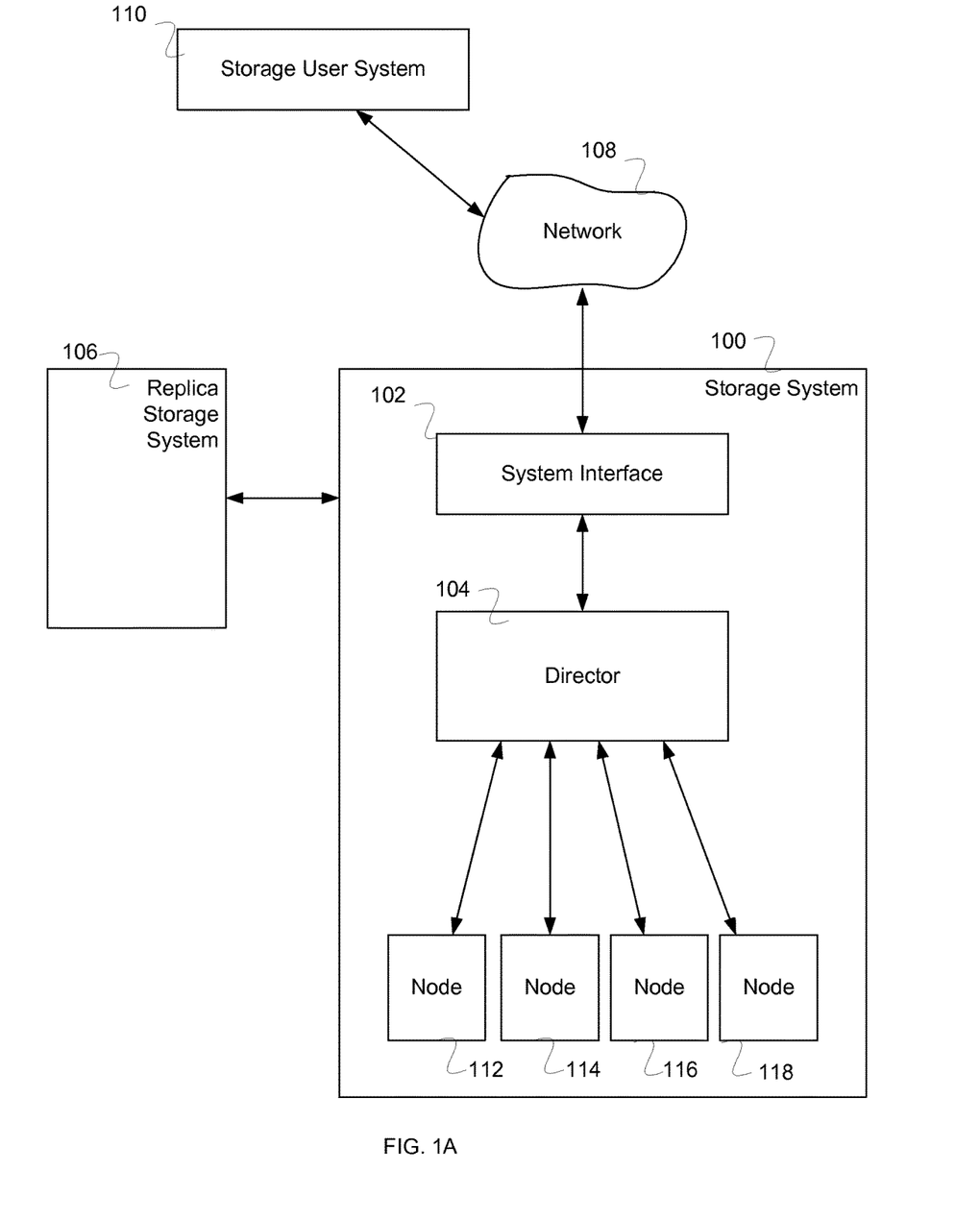
FIG. 1A is a block diagram illustrating an embodiment of a system for storage for data.

FIG. 1A is a block diagram illustrating an embodiment of a system for storage for data. In the example shown, storage system 100 is accessed by a user using storage user system 110 or by storage user system 110 via network 108. In various embodiments, network 108 comprises one or more of a wired network, a wireless network, a local area network, a wide area network, the Internet, or any other appropriate network. Storage system 100 comprises system interface 102, director 104, and a plurality of nodes (represented in FIG. 1A by node 112, node 114, node 116, and node 118). Storage system 100 is replicated using replica storage system 106. For example, a storage unit is replicated by storing segments and metadata stored on the storage unit to another storage unit.

Storage user system 110 breaks a file, a data stream, or a data block into segment(s) (e.g., boundaries are identified for one or more segments—for example, a hash function operates on a portion of the content of the file; when the hash function is equal to a value, is a minimum value, is a maximum value, is between a minimum and maximum length, and/or is an extremum value within a window of the file, etc. a segment boundary is determined). Segment boundaries are determined such that two similar files, data streams, or data blocks have the goal of having the same segments for identical portions of the files, data streams, or data blocks, and different segments for the non-identical portions of the files, data streams, or data blocks. In various embodiments, the segment determination is based on the content of the data (e.g., using value(s) calculated based on data content), not based on the content (e.g., byte count, file criteria, etc.), or a combination of content-based criteria and non-content-based criteria. In various embodiments, storage user system 110 encrypts and/or compresses the segments. Storage user system 110 sends the segment(s) to be stored by storage system 100 via network 108. In various embodiments, information regarding how to reconstruct the file, the data stream, or the data block is also sent from storage user system 110 to storage system 100 and/or is stored by storage user system 110, or any other appropriate action for the information.

Storage system 100 receives the segment using system interface 102. Director 104 directs groupings of segments, or super segments, to a node (e.g., node 112, node 114, node 116, or node 118). In various embodiments, a node comprises a deduplicating storage system, a storage device, multiple storage devices, a portion of a storage device, a hard drive, an array of drives, a semiconductor memory, or any other appropriate components for a node.

A storage node only stores a segment in the event that the segment has not been previously stored in the storage node. In some embodiments, an identifier (e.g., a digital fingerprint, Secure Hash Algorithm hash value, etc.) is used for determining whether a segment has been previously stored by seeing whether an identical identifier already exists in an index of stored segments for storage system 100. In various embodiments, the identifier for a given segment is determined using storage system 100, using storage user system 110, or any other appropriate system. In some embodiments, an identifier is sent along with an associated segment from storage user system 110 to storage system 100.

Storage user system 110 requests one or more segments that is/are stored on storage system 100 via network 108. Storage system 100 receives the request using system interface 102. Director 104 routes request to locate or locates the segments used to store a file, data stream, or data block in the appropriate node(s).

In some embodiments, the one or more segments are sent to storage user system 110 via network 108, and storage user system 110 uses the one or more segments to reconstruct a file, data stream, or data block. In various embodiments, the segment(s) are decrypted and/or decompressed or any other appropriate processing in order to reconstruct the desired file, data stream, or data block.

In some embodiments, the one or more segments are sent to storage user system 110 via network 108 after storage system 100 uses the one or more segments to reconstruct a file, data stream, or data block.

In some embodiments, the functionality split between storage user system 110 and storage system 100 is different: segmentation and storage are both performed by storage system 100. In some embodiments, there are one or more storage user systems feeding segments or data streams to one or more storage systems (e.g., one to many, many to many, shared configuration, or exclusive configuration.

In some embodiments, storage system 100 comprises a processor and a memory. In various embodiments, the processor for storage system 100 comprises a single processor, multiple processors, one or more processors with virtual system(s), or any other appropriate hardware or software to enable storing data on a system.

Figure 1B:
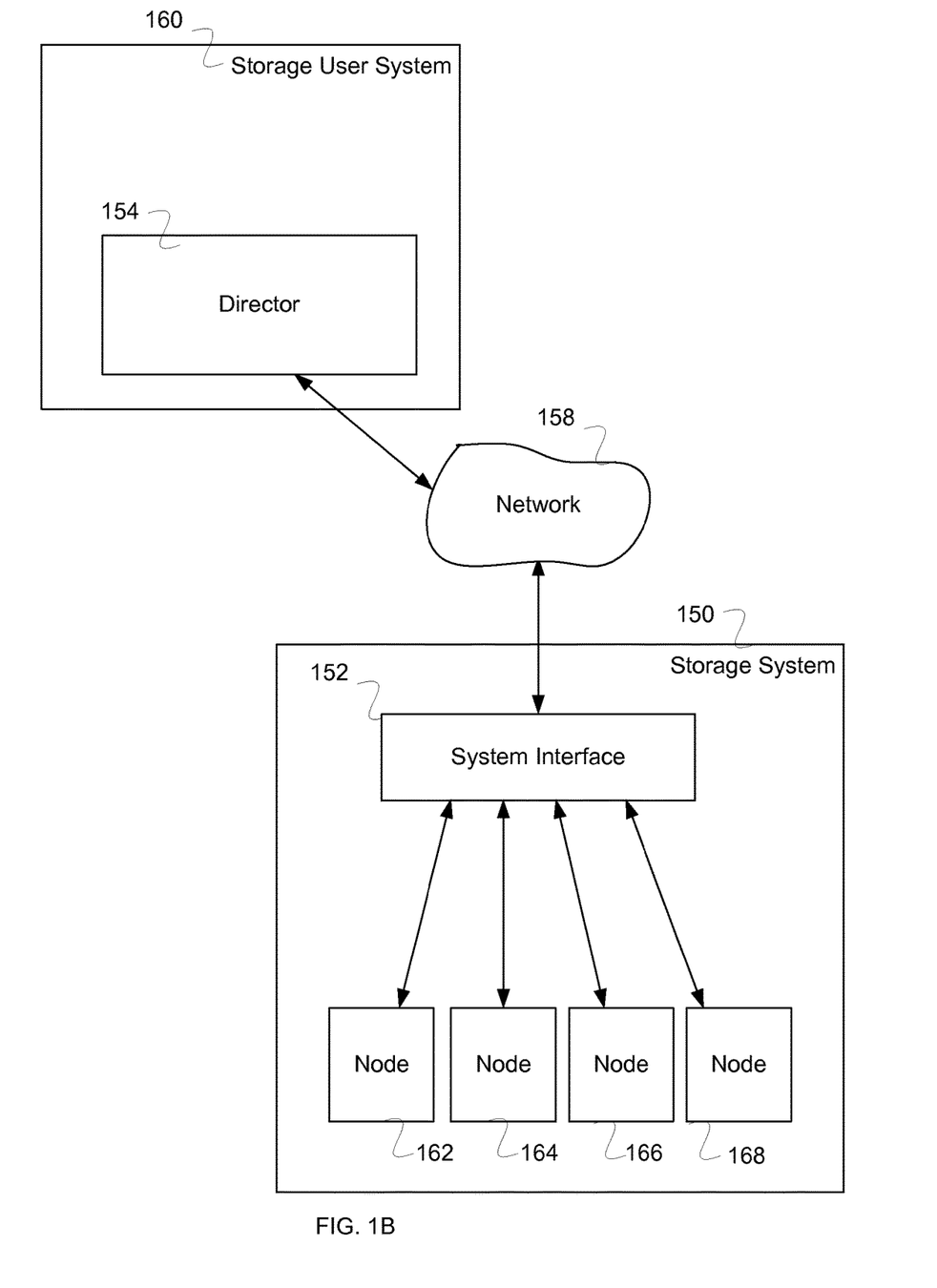
FIG. 1B is a block diagram illustrating an embodiment of a system for storage for data.

FIG. 1B is a block diagram illustrating an embodiment of a system for storage for data. In the example shown, storage system 150 is accessed by a user using storage user system 160 or by storage user system 160 via network 158. Storage user system 160 comprises director 154, which provides an indication of a node (e.g., node 162, node 164, node 166, or node 168) for storing segments, super segments (groupings of segments), or a data stream. In various embodiments, network 158 comprises one or more of a wired network, a wireless network, a local area network, a wide area network, the Internet, or any other appropriate network. Storage system 150 comprises system interface 152 and a plurality of nodes (represented in FIG. 1B by node 162, node 164, node 166, and node 168).

Storage user system 160 breaks a file, a data stream, or a data block into segment(s) (e.g., boundaries are identified for one or more segments—for example, a hash function operates on a portion of the content of the file; when the hash function is equal to a value, is a minimum value, is a maximum value, is between a minimum and maximum length, and/or is an extremum value within a window of the file, etc. a segment boundary is determined). Segment boundaries are determined such that two similar files, data streams, or data blocks have the goal of having the same segments for identical portions of the files, data streams, or data blocks, and different segments for the non-identical portions of the files, data streams, or data blocks. In various embodiments, the segment determination is based on the content of the data (e.g., using value(s) calculated based on data content), not based on the content (e.g., byte count, file criteria, etc.), or a combination of content-based criteria and non-content-based criteria. In various embodiments, storage user system 160 encrypts and/or compresses the segments. Storage user system 160 sends the segment(s) to be stored by storage system 150 via network 158. In various embodiments, information regarding how to reconstruct the file, the data stream, or the data block is also sent from storage user system 160 to storage system 150 and/or is stored by storage user system 160, or any other appropriate action for the information.

Storage system 150 receives the segment using system interface 152. In various embodiments, a node comprises a deduplicating storage system, a storage device, multiple storage devices, a portion of a storage device, a hard drive, an array of drives, a semiconductor memory, or any other appropriate components for a node.

A storage node only stores a segment in the event that the segment has not been previously stored in the storage node. In some embodiments, an identifier (e.g., a digital fingerprint, Secure Hash Algorithm hash value, etc.) is used for determining whether a segment has been previously stored by seeing whether an identical identifier already exists in an index of stored segments for storage system 150. In various embodiments, the identifier for a given segment is determined using storage system 150, using storage user system 160, or any other appropriate system. In some embodiments, an identifier is sent along with an associated segment from storage user system 160 to storage system 150.

Storage user system 160 requests one or more segments that is/are stored on storage system 150 via network 158. Storage system 150 receives the request using system interface 152. Director 154 indicates appropriate node(s) that are to process the request to locate the segments that are then used to store a file, data stream, or data block.

In some embodiments, the one or more segments are sent to storage user system 160 via network 158, and storage user system 160 uses the one or more segments to reconstruct a file, data stream, or data block. In various embodiments, the segment(s) are decrypted and/or decompressed or any other appropriate processing in order to reconstruct the desired file, data stream, or data block.

In some embodiments, the one or more segments are sent to storage user system 160 via network 158 after storage system 150 uses the one or more segments to reconstruct a file, data stream, or data block.

In some embodiments, the functionality split between storage user system 160 and storage system 150 is different: segmentation and storage are both performed by storage system 150. In some embodiments, there are one or more storage user systems feeding segments or data streams to one or more storage systems (e.g., one to many, many to many, shared configuration, or exclusive configuration.

In some embodiments, storage system 150 comprises a processor and a memory. In various embodiments, the processor for storage system 150 comprises a single processor, multiple processors, one or more processors with virtual system(s), or any other appropriate hardware or software to enable storing data on a system.

Figure 2:
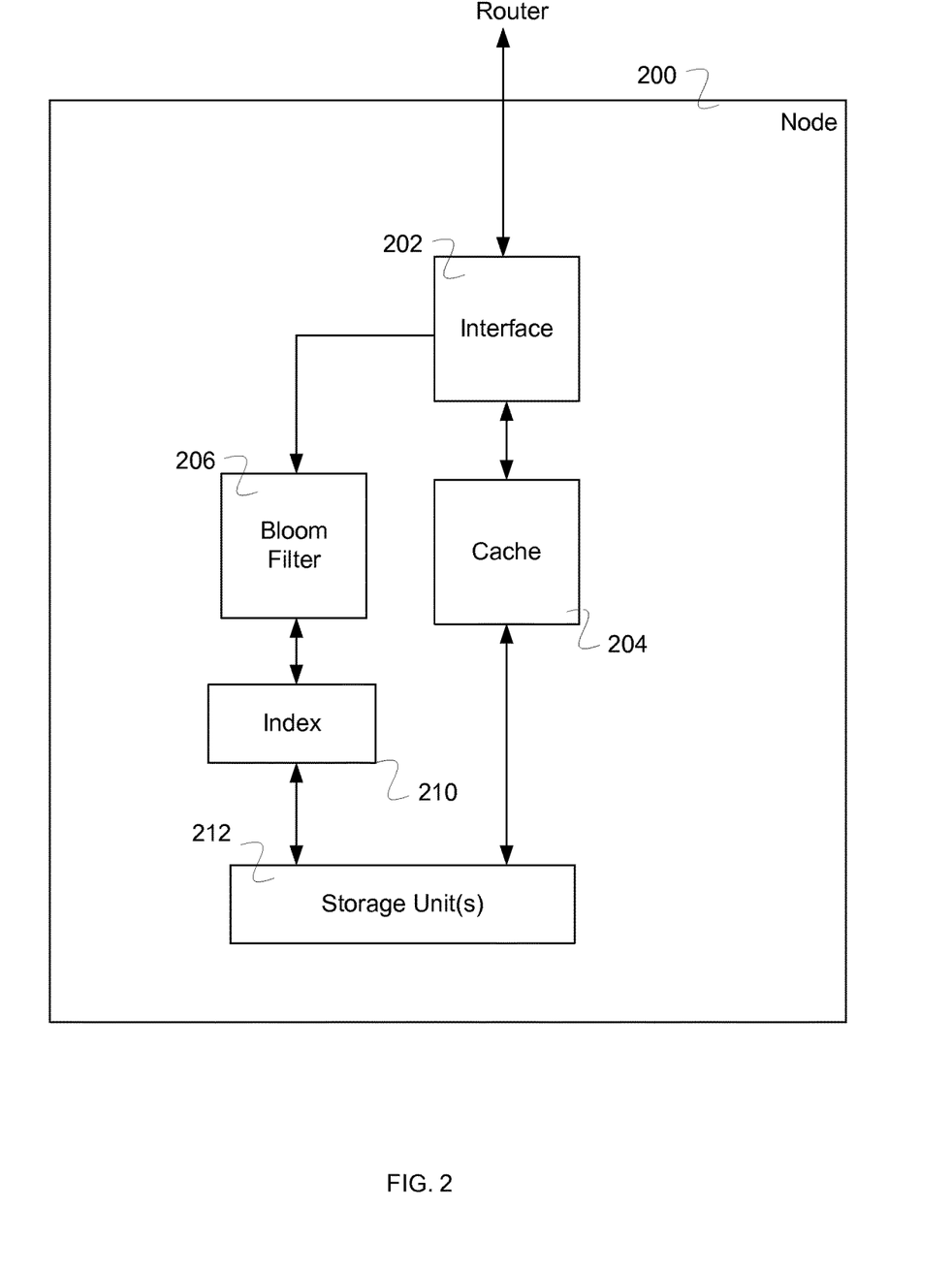
FIG. 2 is a block diagram illustrating an embodiment of a node.

FIG. 2 is a block diagram illustrating an embodiment of a node. In some embodiments, node 200 is used to implement node 112, node 114, node 116, or node 118 of storage system 100 in FIG. 1. In the example shown, node 200 comprises interface 202, cache 204, bloom filter 206, index 210, and storage unit(s) 212. In the example shown, interface 202 receives a request to determine overlap of one or more segments (e.g., of a super segment). In some embodiments, interface 202 includes deduplicating logic. Bloom filter 206 responds to request for determining overlap based at least in part on index 210. Index 210 includes an index of stored segments in storage unit(s) 212. In some embodiments, index 210 comprises a list of hash value(s) for the segments stored in storage unit(s) 212. Interface 202 receives commands to retrieve and store segments in storage unit(s) 212. Cache 204 stores temporarily segment(s) that are to be provided by the node 200 or to be stored by node 200. Node 200 includes one or more processors. Node 200 stores data segments and in the event that a segment has been previously stored, a reference to the previously stored segment is stored instead of the duplicate input segment.

Figure 3:
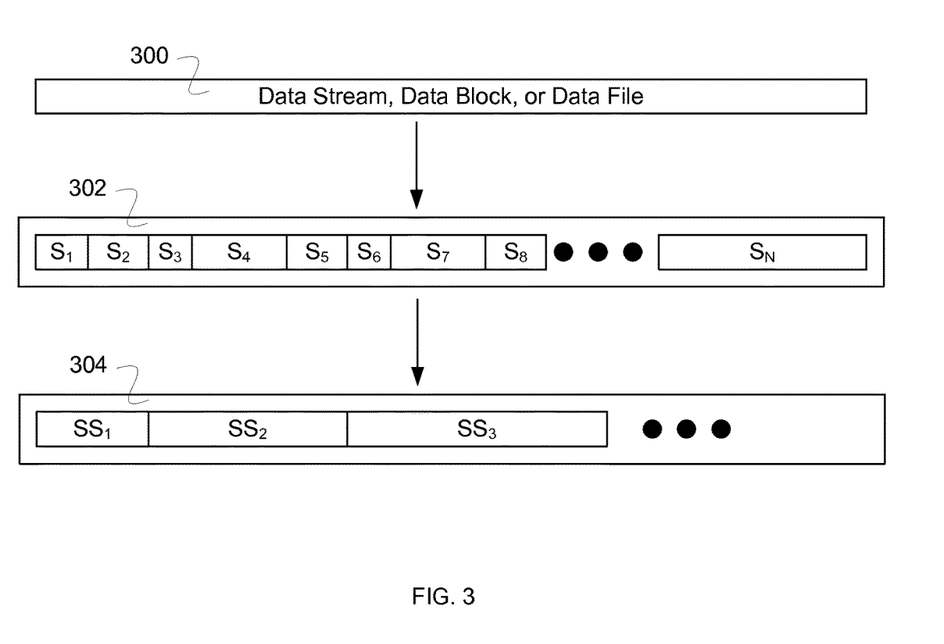
FIG. 3 is a block diagram illustrating an embodiment of input stream, segment, and super segment data configurations.

FIG. 3 is a block diagram illustrating an embodiment of input stream, segment, and super segment data configurations. In the example shown, data stream, data block, or data file 300 is input to a data storage system which breaks up the input into segments 302 (e.g., $S_1$, $S_2$, $S_3$, $S_4$, $S_5$, $S_6$, $S_7$, $S_8$, and $S_N$). In various embodiments, segments 302 have a minimum length, a maximum length, have average size of about 8 KB, or have any other appropriate property. In various embodiments, segments are generated by identifying segment endpoints using a content based algorithm (e.g., in a window of data a hash function on the window is equal to a number, is a minimum/maximum/extremum value for all windows, has a pattern of 1's or 0's in predetermined bit locations, etc.), using a non-content based algorithm (e.g., has a predetermined length, has a minimum length, a maximum length, associated with a file length, etc.), or a combination of the content based and non-content based algorithms, or any other appropriate manner of determining segment endpoints. Segments 302 are broken into super segments 304 (e.g., $SS_1$, $SS_2$, and $SS_3$). In various embodiments, super segments are generated by identifying super segment endpoints using content based algorithm (e.g., in a window of data a hash function on the window is equal to a number, is a minimum/maximum/extremum value for all windows where the window comprise a first segment in the super segment or a portion of the first segment of the super segment, has a pattern of 1's or 0's in predetermined bit locations, etc.), using a non-content based algorithm (e.g., has a predetermined length, has a minimum length, a maximum length, associated with a file length, etc.), or a combination of the content based and non-content based algorithms, or any other appropriate manner of determining super segment endpoints. Super segments 304 enable efficient storage (e.g., in terms of retrieval times and/or compression efficiency) by routing adjacent data to be stored together on a node. In some embodiments, super segments comprise multiple segments, are approximately 1 MB in size, or have any other appropriate property.

Figure 4:
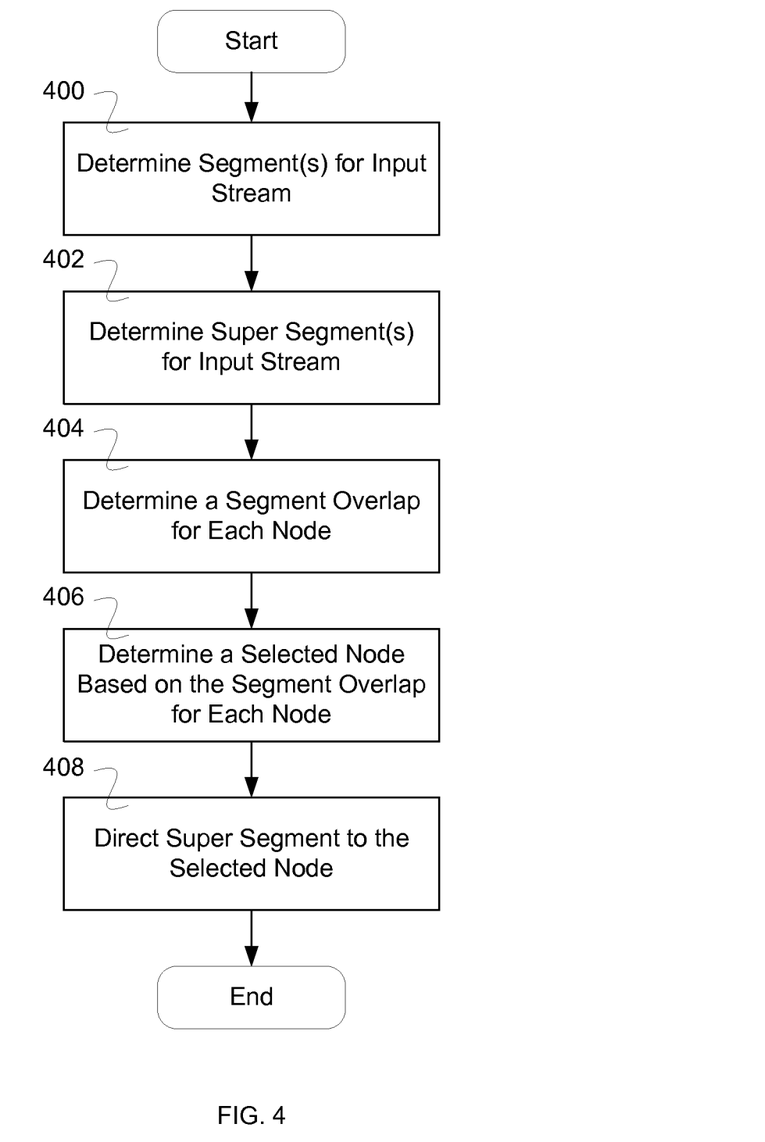
FIG. 4 is a flow diagram illustrating an embodiment of a process for directing a super segment.

FIG. 4 is a flow diagram illustrating an embodiment of a process for directing a super segment. In the example shown, in 400 segment(s) is/are determined for input stream. In 402, super segment(s) is/are determined for input stream. In some embodiments, a super segment is determined from the segment(s) of the input stream. In 404, a segment overlap is determined for each node. In 406, a selected node is determined based on the segment overlap for each node. In 408, a super segment is directed to the selected node.

Figure 5:
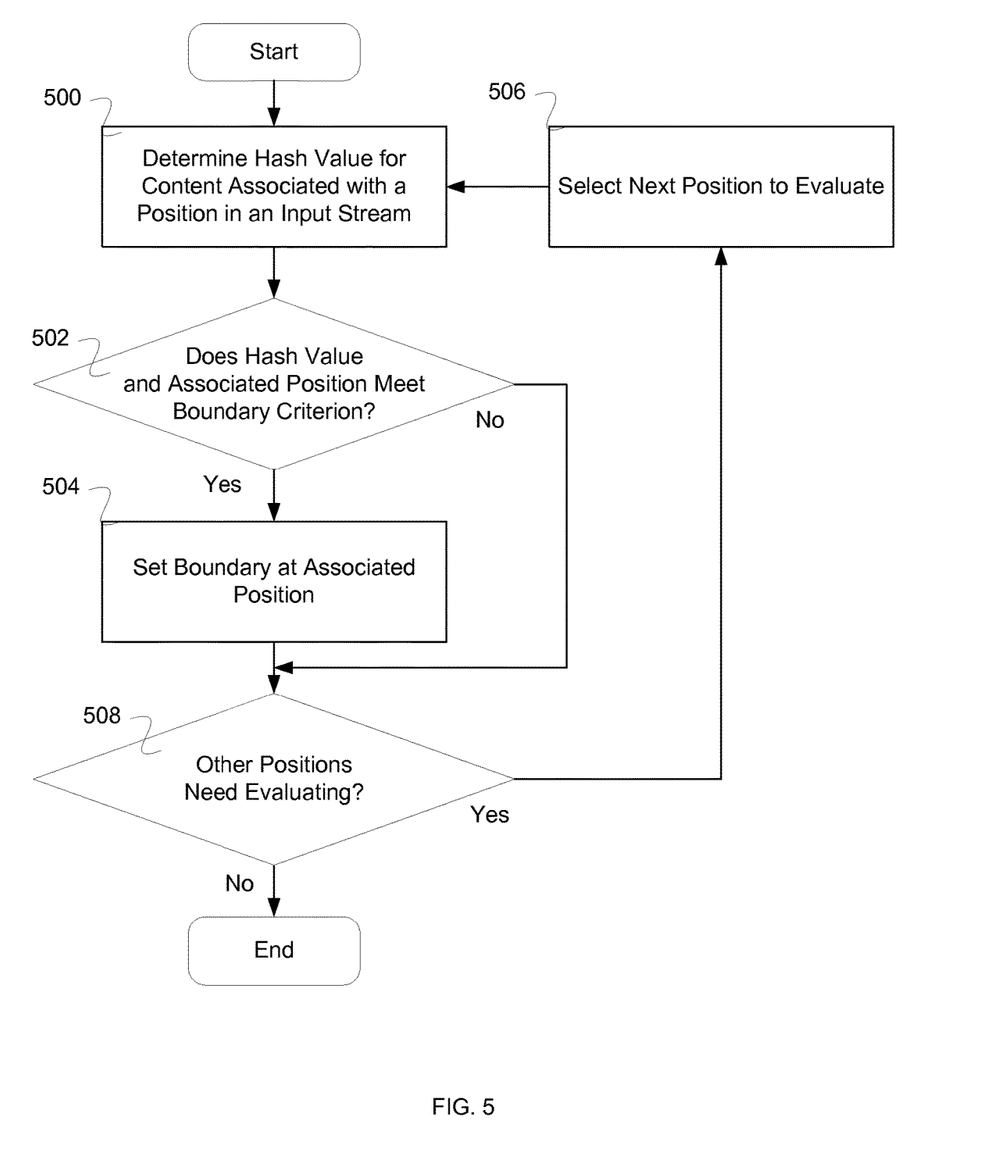
FIG. 5 is a flow diagram illustrating an embodiment of a process for determining segments.

FIG. 5 is a flow diagram illustrating an embodiment of a process for determining segments. In some embodiments, the process of FIG. 5 is used to implement 400 of FIG. 4. In the example shown, in 500 a hash value for content associated with a position in an input stream is determined. In 502, it is determined whether the hash value and associated position meet a boundary criterion. In the event that the hash value and associated position meet the boundary condition, in 504 the boundary is set at the associated position. In the event that the hash value and associated position do not meet the boundary condition, control passes to 508. In 508, it is determined whether other positions need evaluating. In the event that other positions need evaluating, in 506 a next position to evaluate is selected. In the event that other positions do not need evaluating, the process ends.

Figure 6:
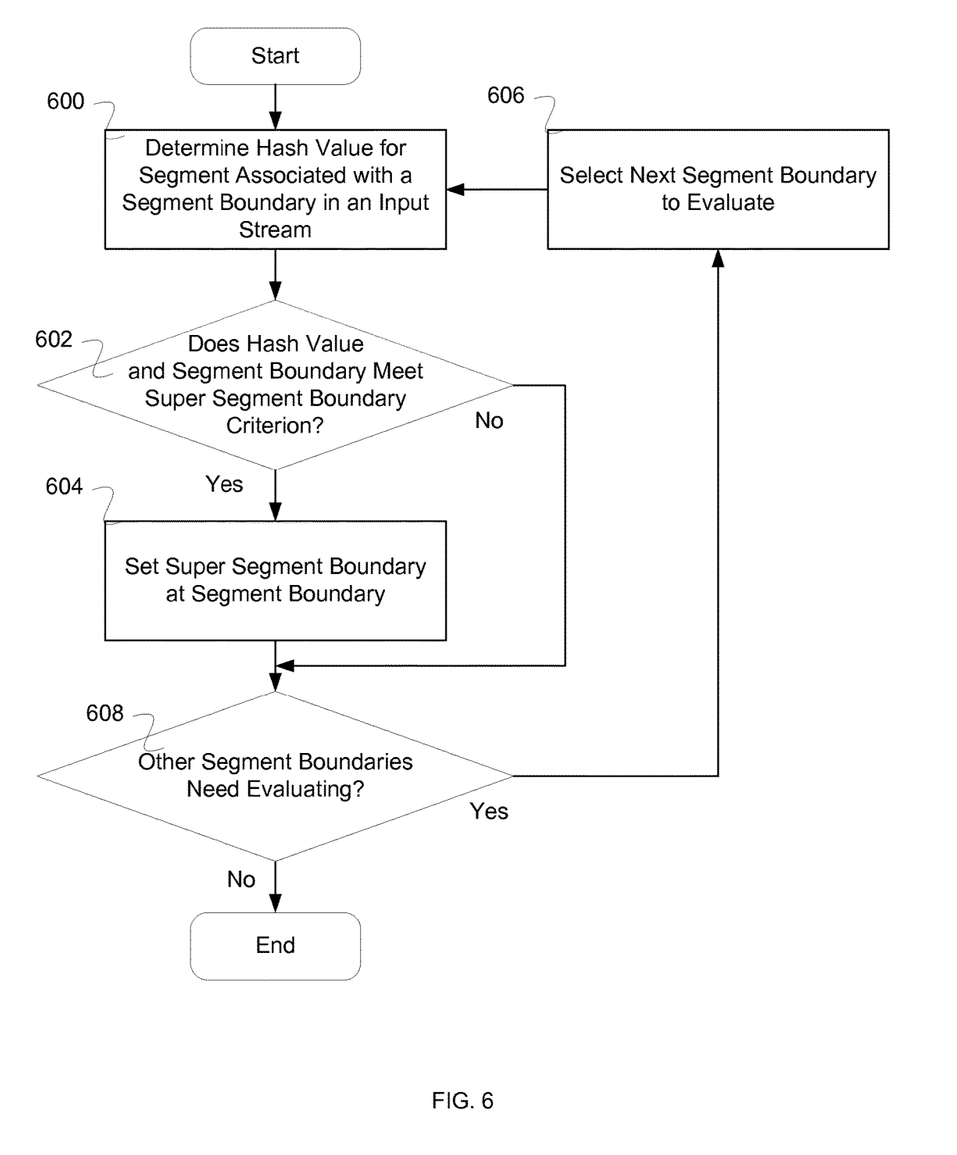
FIG. 6 is a flow diagram illustrating an embodiment of a process for determining super segments.

FIG. 6 is a flow diagram illustrating an embodiment of a process for determining super segments. In some embodiments, the process of FIG. 6 is used to implement 402 of FIG. 4. In the example shown, in 600 a hash value for segment associated with a segment boundary in an input stream is determined. In 602, it is determined whether the hash value and segment boundary meet a super segment boundary criterion. In the event that the hash value and segment boundary meet the super segment boundary condition, in 604 the super segment boundary is set at the segment boundary. In the event that the hash value and segment boundary do not meet the super segment boundary condition, control passes to 608. In 608, it is determined whether other segment boundaries need evaluating. In the event that other segment boundaries need evaluating, in 606 a next segment boundary to evaluate is selected. In the event that other segment boundaries do not need evaluating, the process ends.

Figure 7:
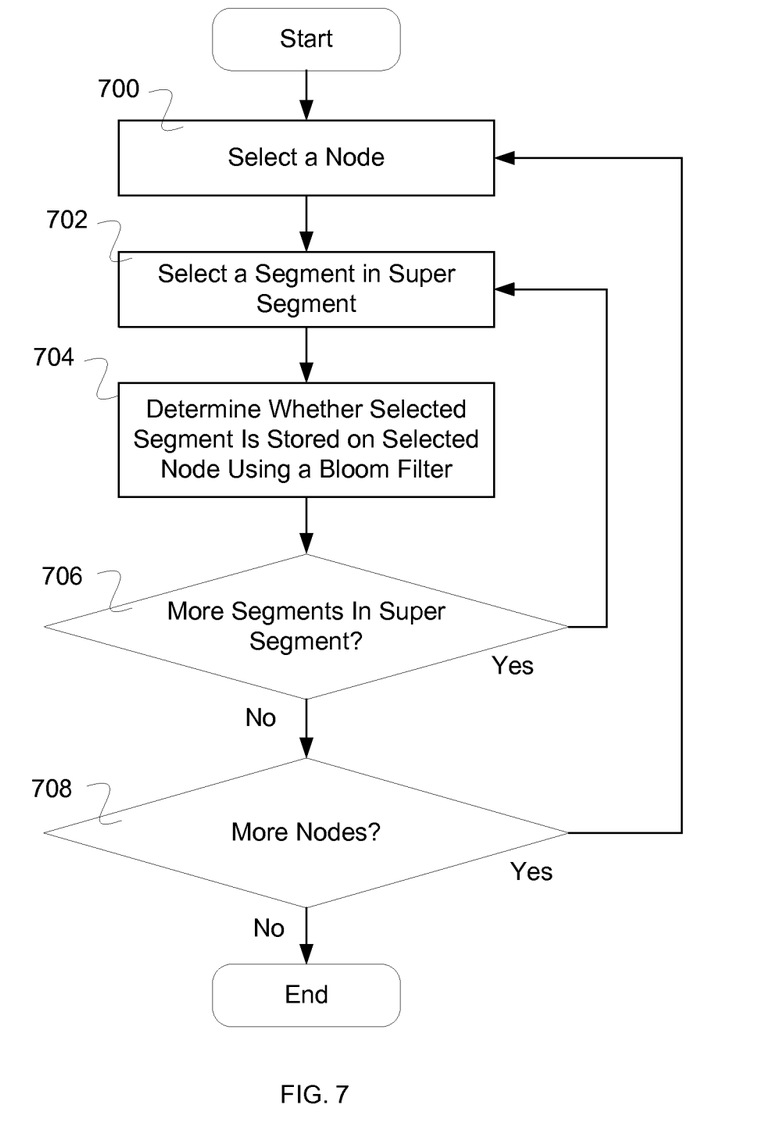
FIG. 7 is a flow diagram illustrating an embodiment of a process for determining overlap.

FIG. 7 is a flow diagram illustrating an embodiment of a process for determining overlap. In some embodiments, the process in FIG. 7 is used to implement 404 of FIG. 4. In the example shown, in 700 a node is selected. In 702, a segment in a super segment is selected. In various embodiments, all segments are selected or a sampling of segments are selected (e.g., a segment is selected in the event that certain bits in the fingerprint of the segment have predetermined values). In 704, it is determined whether selected segment is stored on selected node using a Bloom filter. In some embodiments, the Bloom filter of 704 of FIG. 7 comprises Bloom filter 206 of FIG. 2. In various embodiments, a storage user system (e.g., storage user system 110 of FIG. 1) or storage interface of a storage system (e.g., storage system interface 102) have a Bloom filter and keep track of the nodes to which segments are directed. In 706, it is determined whether there are more segments in the super segment. In the event that there are more segments in the super segment, control passes to 702. In the event that there are no more segments in the super segment, control passes to 708. In 708, it is determined whether there are more nodes. In the event that there are more nodes, control passes to 700. In 708, in the event that there are no more nodes, the process ends.

Figure 8:
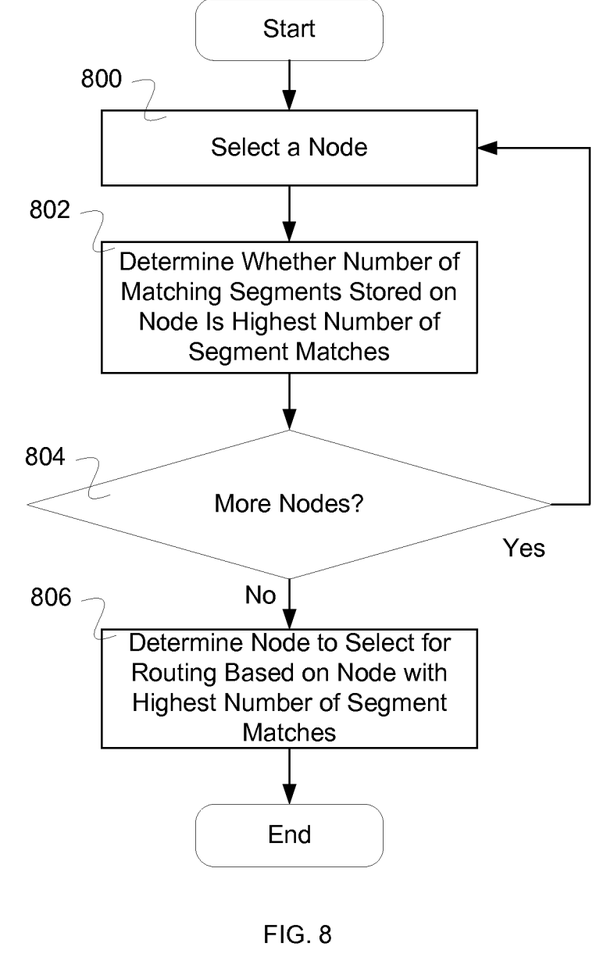
FIG. 8 is a flow diagram illustrating an embodiment of a process for determining a selected node.

FIG. 8 is a flow diagram illustrating an embodiment of a process for determining a selected node. In some embodiments, the process for FIG. 8 is used to implement 406 of FIG. 4. In the example shown, in 800 a node is selected. In 802, it is determined whether the number of matching segments stored on node is the highest number of segment matches. In various embodiments, ties in the highest number of segment matches are determined in favor of a node with the lowest load, a node with ID selected randomly, a hash of the segment or portion of the segment (e.g., the first 32 bytes), or any other appropriate tie breaking manner. In 804, it is determined whether there are more nodes. In the event that there are more nodes, control passes to 800. In the event that there are not more nodes, in 806 the node to select for routing is determined based on the node with the highest number of segment matches.

Figure 9A:
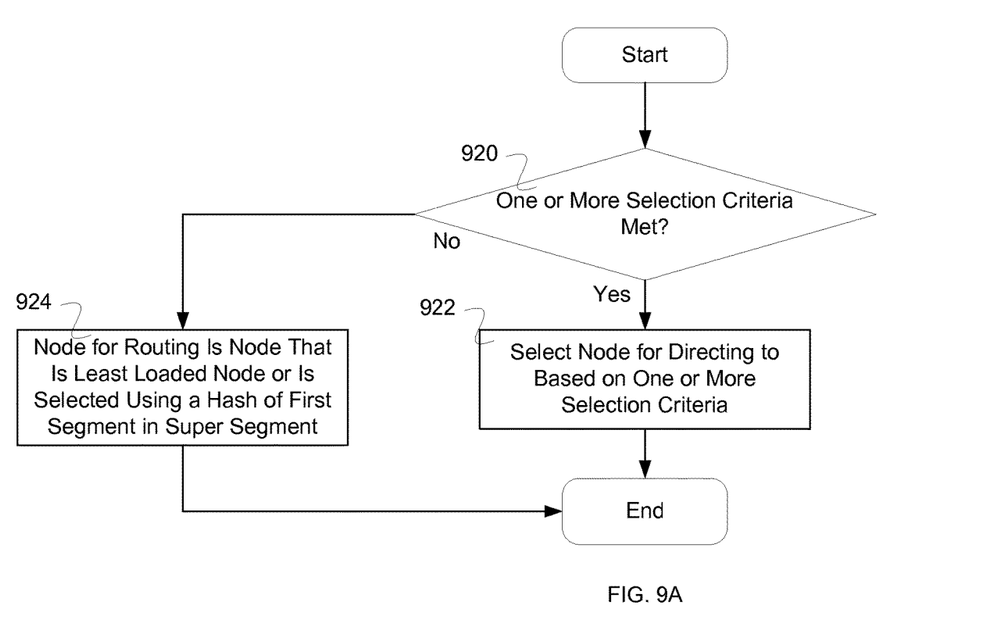
FIG. 9A is a flow diagram illustrating an embodiment of a process for selecting a node for routing.

FIG. 9A is a flow diagram illustrating an embodiment of a process for selecting a node for routing. In some embodiments, the process of FIG. 9A is used to implement 806 of FIG. 8. In the example shown, in 920 it is determined whether one or more selection criteria is/are met. In various embodiments, a selection criterion comprises the most number of matches to stored segment, the least loaded node compared to others, based on content of a segment, based on a meta data of the segment (e.g., a file name, a directory name, a hash value, a file size, a create date, a segment size, etc.), or any other appropriate selection criteria. In the event that the one or more selection criteria is/are met, then in 922 the node for directing to is based on the one or more selection criteria. In various embodiments, the selection of a node is based at least in part on a rule, based on a predetermined table, based on an algorithm, or any other appropriate manner of selection. In the event that the one or more selection criteria is/are not met, then in 924 the node for routing is the node that is the least loaded node or is selected using a hash of a first segment in the super segment (e.g., a hash value based on the content of the entire first segment, of the first K bytes of the first segment, of all bytes in the super segment, etc.).

Figure 9B:
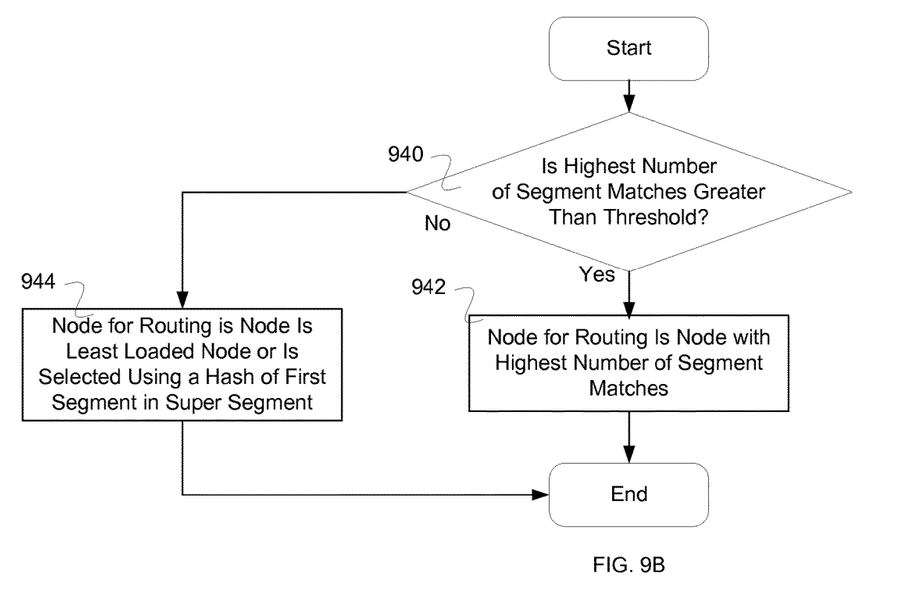
FIG. 9B is a flow diagram illustrating an embodiment of a process for selecting a node for routing.

FIG. 9B is a flow diagram illustrating an embodiment of a process for selecting a node for routing. In some embodiments, the process of FIG. 9B is used to implement 806 of FIG. 8. In the example shown, in 940 it is determined whether the highest number of segment matches is greater than a threshold. In various embodiments, the threshold is based at least in part on the number of segments (C) in the super segment and the number of nodes (N), 1.5* C/N, or any other appropriate threshold. In the event that the highest number of segment matches is greater than the threshold, then in 942 the node for routing is the node with the highest number of segment matches. In the event that the highest number of segment matches is not greater than the threshold, then in 944 the node for routing is the node that is the least loaded node or is selected using a hash of a first segment in the super segment (e.g., a hash value based on the content of the entire first segment, of the first K bytes of the first segment, of all bytes in the super segment, etc.).

Figure 9C:
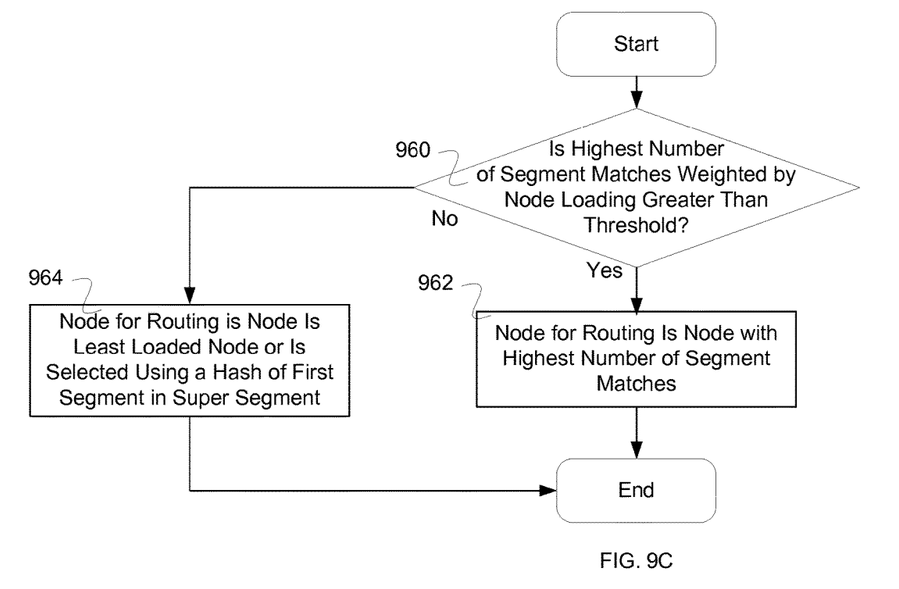
FIG. 9C is a flow diagram illustrating an embodiment of a process for selecting a node for routing.

FIG. 9C is a flow diagram illustrating an embodiment of a process for selecting a node for routing. In some embodiments, the process of FIG. 9C is used to implement 806 of FIG. 8. In the example shown, in 960 it is determined whether the highest number of segment matches weighted by node loading is greater than a threshold. In various embodiments, weighting by node load comprises weighting by a function of a node's current load versus maximum load, by a node's current load versus the total load of all other nodes, or any other appropriate weighting. In various embodiments, the weighting comprises one or more of the following: a weight proportional to an inverse of a node loading, a weight proportional to an inverse of a node loading squared, a weight value set to zero in the event that a node load exceeds a relative loading threshold, a weight described using a linear function, a weight described using a non-linear function, or any other appropriate weighting. In various embodiments, the threshold comprises a predetermined threshold, a threshold that varies over time, a threshold that is adaptive (e.g., based on loading of the node, loading of other nodes, etc.), or any other appropriate threshold. In various embodiments, the threshold is based at least in part on the number of segments (C) in the super segment and the number of nodes (N), 1.5*C/N, or any other appropriate threshold. In some embodiments, a match value is decreased—in some embodiments to zero—in the event that the size of the space used for storage on a node is relatively too high compared to the average space used for storage on the nodes. In the event that the highest number of segment matches is greater than the threshold, then in 962 the node for routing is the node with the highest number of segment matches. In the event that the highest number of segment matches is not greater than the threshold, then in 964 the node for routing is the node that is the least loaded node or is selected using a hash of a first segment in the super segment (e.g., a hash value based on the content of the entire first segment, of the first N bytes of the first segment, of all bytes in the super segment, etc.).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for directing for storage, comprising:
    a processor configured to:
        segment input data into a plurality of segments using a content based algorithm;
        determine a super segment containing two or more segments from the plurality of segments, wherein determining the super segment comprises setting a super segment boundary in the event that a hash of a first segment of the plurality of segments with an associated segment boundary meets a super segment boundary criteria;
        determine a segment overlap for each of a plurality of nodes, wherein the segment overlap comprises a number of matching segments from the super segment that are stored on a node of the plurality of nodes;
        determine a selected node of the plurality of nodes by comparing a number of matching segments of a node of the plurality of nodes having a highest number of matching segments to a threshold, wherein the threshold is based at least in part on a total number of the plurality of segments that are contained in the super segment and a total number of nodes, the selected node having the highest number of matching segments which is greater than the threshold, ties in the highest number of matching segments are determined with a predetermined tie breaking strategy, wherein in the event that the segment overlap does not exceed the threshold, the selected node is determined based at least in part on a content of a super segment or based at least in part on a least loaded node of the plurality of nodes; and
        direct a super segment to the selected node; and
    a memory coupled to the processor and configured to provide the processor with instructions.

2. The system as in claim 1, wherein the input data comprises an input stream.

3. The system as in claim 1, wherein the content based algorithm comprises a hash of a content of the input data.

4. The system as in claim 1, wherein the hash for setting the super segment boundary comprises a hash over an initial portion of content of the super segment.

5. The system as in claim 1, wherein super segment boundary criteria are based at least in part on a minimum length and a maximum length.

6. The system as in claim 1, wherein the threshold is proportional to a number of segments in a super segment.

7. The system as in claim 1, wherein the threshold is inversely proportional to a number of nodes in the plurality of nodes.

8. The system as in claim 1, wherein in the event that the segment overlap does not exceed the threshold, determining the selected node based at least in part on a content of a super segment.

9. The system as in claim 8, wherein determining is based on a hash of a content of a segment of the super segment.

10. The system as in claim 1, wherein in the event that the segment overlap does not exceed the threshold, determining the selected node based at least in part on a loading of a node.

11. The system as in claim 1, wherein determining the selected node is based at least in part on the segment overlap weighted by a loading of a second node.

12. The system as in claim 11, wherein the weighting comprises one or more of the following: a weight proportional to an inverse of a node loading, a weight proportional to an inverse of a node loading squared, a weight value set to zero in the event that a node load exceeds a relative loading threshold, a weight described using a linear function, and a weight described using a non-linear function.

13. The system as in claim 1, wherein the threshold comprises one of the following: a predetermined threshold, a threshold that varies over time, or a threshold that is adaptive.

14. The system as in claim 1 wherein the threshold is equal to 1.5 multiplied by the total number of the plurality of segments divided by the number of nodes.

15. A method for directing for storage, comprising:
- segmenting, using a processor, input data into a plurality of segments using a content based algorithm;
- determining, using the processor, a super segment containing two or more segments from the plurality of segments, wherein determining the super segment comprises setting a super segment boundary in the event that a hash of a first segment of the plurality of segments with associated segment boundary meets a super segment boundary criteria;
- determining, using the processor, a segment overlap for each of a plurality of nodes, wherein the segment overlap comprises a number of matching segments from the super segment that are stored on a node of the plurality of nodes;
- determining, using the processor, a selected node of the plurality of nodes by comparing a number of matching segments of a node of the plurality of nodes having a highest number of matching segments to a threshold, wherein the threshold is based at least in part on a total number of the plurality of segments that are contained in the super segment and a total number of nodes, the selected node having the highest number of matching segments which is greater than the threshold, ties in the highest number of matching segments are determined with a predetermined tie breaking strategy, wherein in the event that the segment overlap does not exceed the threshold, the selected node is determined based at least in part on a content of a super segment or based at least in part on a least loaded node of the plurality of nodes; and
- directing using the processor, a super segment to the selected node.

16. The method as in claim 15 wherein the threshold is equal to 1.5 multiplied by the total number of the plurality of segments divided by the number of nodes.

17. A computer program product for directing for storage, the computer program product being embodied in a non-transitory computer readable storage medium and comprising computer instructions for:
- segmenting, using a processor, input data into a plurality of segments using a content based algorithm;
- determining, using the processor, a super segment containing two or more segments from the plurality of segments, wherein determining the super segment comprises setting a super segment boundary in the event that a hash of a first segment of the plurality of segments with associated segment boundary meets a super segment boundary criteria;
- determining, using the processor, a segment overlap for each of a plurality of nodes, wherein the segment overlap comprises a number of matching segments from the super segment that are stored on a node of the plurality of nodes;
- determining, using the processor, a selected node of the plurality of nodes by comparing a number of matching segments of a node of the plurality of nodes having a highest number of matching segments to a threshold, wherein the threshold is based at least in part on a total number of the plurality of segments that are contained in the super segment and a total number of nodes, the selected node having the highest number of matching segments which is greater than the threshold, ties in the highest number of matching segments are determined with a predetermined tie breaking strategy, wherein in the event that the segment overlap does not exceed the threshold, the selected node is determined based at least in part on a content of a super segment or based at least in part on a least loaded node of the plurality of nodes; and
- directing, using the processor, a super segment to the selected node.

18. The computer program product as in claim 17 wherein the threshold is equal to 1.5 multiplied by the total number of the plurality of segments divided by the number of nodes.

* * * * *